Figure 4:
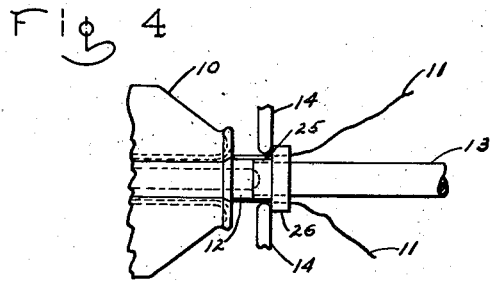

April 12, 1932.  J. M. VAN DER POEL ET AL  1,853,947
APPARATUS FOR STRAIGHTENING LEAD WIRES
Filed June 17, 1931  2 Sheets-Sheet 1
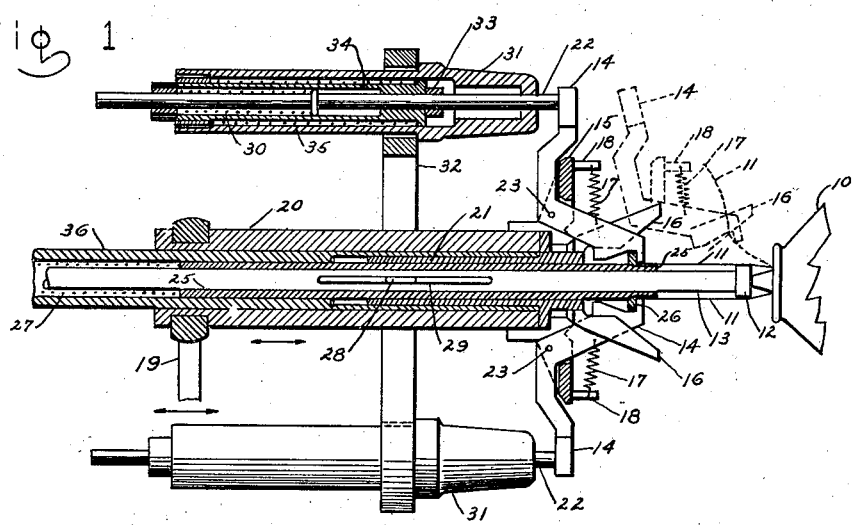
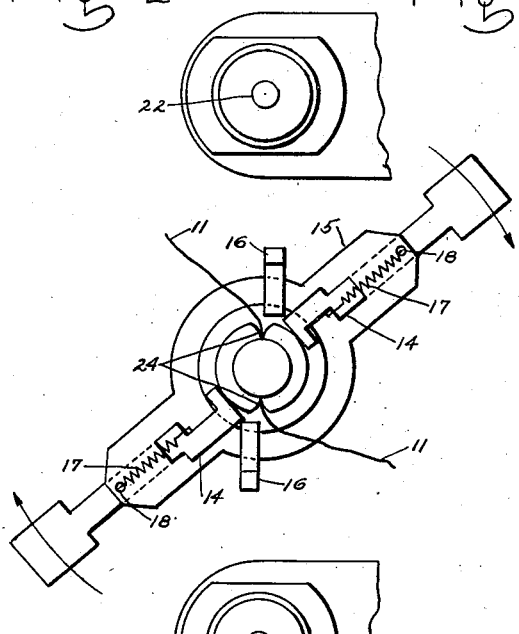
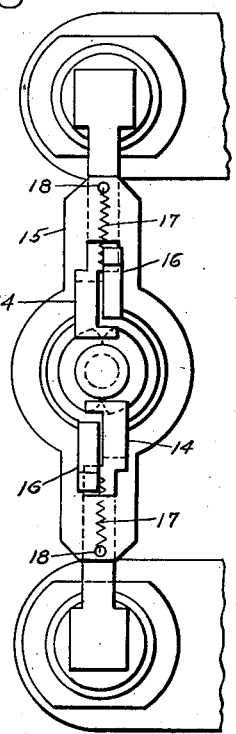
Inventors:
Johannes M.v.D. Poel,
Henricus Gooskens,
by Charles E. Mullen
Their Attorney.

April 12, 1932.  J. M. VAN DER POEL ET AL  1,853,947

APPARATUS FOR STRAIGHTENING LEAD WIRES

Filed June 17, 1931  2 Sheets-Sheet 2

Inventors:
Johannes M.v.D. Poel,
Henricus Gooskens,
by Charles E. Mullen
Their Attorney.

Patented Apr. 12, 1932

1,853,947

UNITED STATES PATENT OFFICE

JOHANNES MARINUS VAN DER POEL AND HENRICUS GOOSKENS, OF EINDHOVEN, NETHERLANDS, ASSIGNORS TO GENERAL ELECTRIC COMPANY, A CORPORATION OF NEW YORK

APPARATUS FOR STRAIGHTENING LEAD WIRES

Application filed June 17, 1931, Serial No. 545,058, and in the Netherlands June 26, 1931.

Our invention relates to apparatus for straightening the lead wires of unbased incandescent electric lamps and similar devices so as to facilitate the threading of such wires through the bases which are subsequently applied. This requires that the said lead wires extend in the proper direction and that they be free from kinks. Such wires are ordinarily springy and must be given a permanent set during the straightening operation. An object of our invention is to provide apparatus for stretching the wire to take out the kinks and for giving the wire an extra hard final pull to give it a permanent set.

According to our invention, we provide pivotally mounted feelers and cooperating guides so mounted that the feeler may be moved in a horizontal plane to engage a lead wire which may extend from the lamp in most any direction and to move said wire into engagement with a guide. The feeler is then rocked to force the lead wire along the guide until it extends in approximately the required direction. The wire is then gripped between the end of the feeler and a gripping member which, with the feeler, is movably supported. Means are provided for causing the end of the feeler to clamp the wire against the said member. The feeler and cooperating member are then moved away from the lamp or other device to stretch the wire and take out the kinks. This stretching is preferably over a stationary support located adjacent the end of the lamp or similar device carrying the wires. As the wire straightens out, the pull on the clamping members is such that they slip over the wire until they reach a position near its end when means come into operation for forcing the feeler into firmer contact with its cooperating member and causing it to grip the wire more firmly than before. The result is that an extra hard pull is given the wire before the gripping device slips off of it. This gives the wire a permanent set. Various other features and advantages of our invention will appear from the following detailed description of species thereof.

In the drawings Fig. 1 is an elevation, partly sectioned, of the device embodying our invention. Figs. 2 and 3 are front elevations showing feelers comprised in said device in different positions; and Figs. 4, 5, 6 and 7 show different steps in the straightening process.

Figure 5:
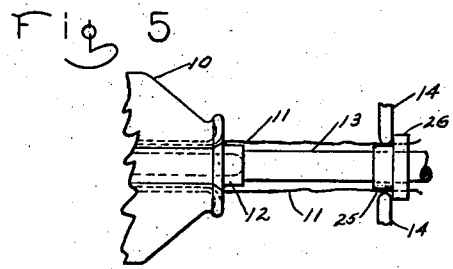

Referring to Fig. 1, a bulb 10 of an incandescent electric lamp with leading-in wires 11 is placed against a knob 12 at the end of a stationary shaft 13. Feelers 14 (Fig. 2) with their support 15 rotate in the direction of the arrows (drive not shown), engage each of the lead wires 11 and place each of them against a guide stop 16. This brings said feelers 14 into the position shown in dotted lines in Fig. 1, with their lower ends held up by springs 17 fastened to pins 18 in feeler support 15. The feelers 14 are now moved to the left in Fig. 1 by an arm 19 through a sleeve 20 upon which the support 15 is mounted. Stops 16 also are moved to the left, being mounted on a sleeve 21 which is locked between the sleeve 20 and support 15. The top parts of feelers 14 strike plungers 22 and pivot about pins 23 in support 15, thus pushing the wires 11 into grooves 24 of the movable sleeve 25. This position is shown in Fig. 4. The lower ends of feelers 14 engage a collar 26 on sleeve 25 so that said sleeve 25 moves to the left in Fig. 1 with said feelers 14. A spring 27 provides the return movement for sleeve 25. The sleeves 25 and 21 are held from rotating by a key 28 which is fastened to sleeve 25 and rides in a slot in the sleeve 21 and in slot 29 in the fixed shaft 13. Fig. 5 shows an intermediate position in the travel of feelers 14 and sleeve 25 with the wires 11 held between them.

Figure 6:
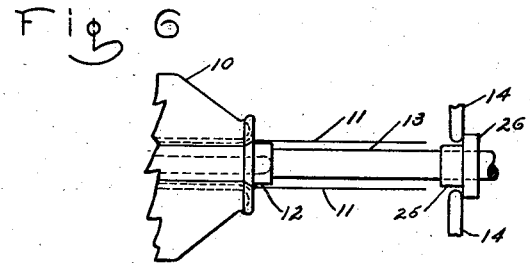
Figure 7:
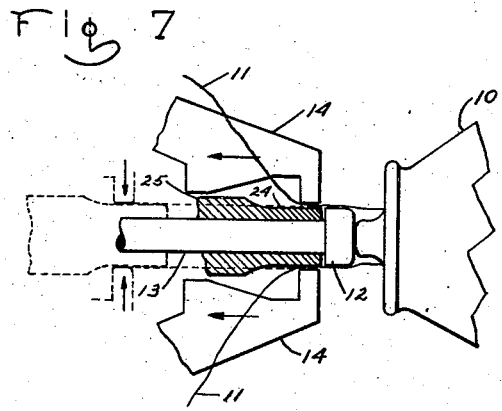

The plungers 22 are pushed back against springs 30 in the housings 31, which are held by an arm 32 mounted in the frame of the machine (not shown). The compression of springs 30 causes feelers 14 to push wires 11 more firmly into grooves 24 of sleeve 25 as said feelers move to the left, thus causing wires 11 to be gripped more and more firmly. Just before feelers 14 slide off the ends of wires 11, a collar 33 on each of the plungers 22 comes in contact with a sleeve 34 which compresses a spring 35. This compression of spring 35 causes feelers 14 to grip wires 11 so firmly that during the further movement of said feelers and sleeve 25 the wires 11 are given an extra hard pull. Fig. 6 shows the position in which the feelers 14 have just slid off the ends of wires 11. The feelers 14 are now moved to the right in Fig. 1 by the arm 19 and are also rotated about the fixed bushing 36, thus placing them in the position shown in Fig. 2 where they are again ready to repeat the process.

In operation, feelers 14, in the position shown in Fig. 2, rotate in the direction of the arrow, engage each of the wires 11 and place them against each of guide stops 16. Said feelers 14 in the position shown in dotted lines in Fig. 1, now move to the left so that their upper ends strike plungers 22, held forward by springs 30, and their lower ends push the wires 11 into grooves 24 of the movable sleeve 25. The feelers 14 and sleeve 25 continue to move to the left with the wires 11 held between them and just before leaving said wires 11, said feelers 14 are pressed against the wires with sufficiently greater force, due to a second spring 35, to cause said wires 11 to be given an extra hard pull by the subsequent movement of said feelers 14 and sleeve 25 and to acquire a permanent set.

What we claim as new and desire to secure by Letters Patent of the United States is:

1. In an apparatus for straightening a wire extending from a device, the combination of means for supporting said device, a movable member mounted adjacent to said device and carrying a pivotally mounted feeler having one end thereof shaped to grip a wire, a guide and a gripping member mounted so as to cooperate with the end of said feeler, means for reciprocating said movable member toward and away from said device, means for causing said feeler to engage said wire and move it into engagement with said guide and means for then causing said feeler to be tilted to cause its end to clamp said wire against said gripping member.

2. In an apparatus for straightening a wire extending from a device, the combination of means for supporting said device, a movable member mounted adjacent to said device and carrying a pivotally mounted feeler having one end thereof shaped to grip a wire, a guide and a gripping member mounted so as to cooperate with the end of said feeler, means for reciprocating said movable member toward and away from said device, means for causing said feeler to engage said wire and move it into engagement with said guide, means for then causing said feeler to be tilted to cause its end to clamp said wire against said gripping member, and means for causing an increased pressure of said feeler against said gripping member as the end of said wire is reached.

3. In an apparatus of the class described, the combination of means for supporting a device having leads extending therefrom, a stationary support, a movable sleeve carrying a pivotally mounted feeler having one end thereof shaped to grip a wire, a guide and a gripping member mounted so as to cooperate with the end of said feeler, means for reciprocating said sleeve toward and away from said device, means for causing said feeler to engage said wire and move it into engagement with said guide and means for then causing said feeler to be tilted to cause its end to clamp said wire against said gripping member.

4. In an apparatus of the class described, the combination of means for supporting a device having leads extending therefrom, a stationary support, a movable sleeve carrying a rotatably and pivotally mounted feeler having one end thereof shaped to grip a wire, a guide and a gripping member mounted so as to cooperate with the end of said feeler, means for reciprocating said sleeve toward and away from said device, means for rotating said feeler to engage said wire and move it into engagement with said guide and means for then causing said feeler to be tilted to cause its end to clamp said wire against said gripping member.

5. In an apparatus of the class described, the combination of means for supporting a device having leads extending therefrom, a stationary support, a movable sleeve carrying a pivotally mounted feeler having one end thereof shaped to grip a wire, a guide and a gripping member mounted so as to cooperate with the end of said feeler, means for reciprocating said sleeve toward and away from said device, means for causing said feeler to engage said wire and move it into engagement with said guide, means for then causing said feeler to be tilted to cause its end to clamp said wire against said gripping member, and means for causing an increased pressure of said feeler against said gripping member as the end of said wire is reached.

6. In an apparatus of the class described, the combination of means for supporting a device having leads extending therefrom, a stationary support, a movable sleeve carrying a rotatably and pivotally mounted feeler having one end thereof shaped to grip a wire, a guide and a gripping member mounted so as to cooperate with the end of said feeler, means for reciprocating said sleeve toward and away from said device, means for rotating said feeler to engage said wire and move it into engagement with said guide, means for then causing said feeler to be tilted to cause its end to clamp said wire against said gripping member, and means for causing an increased pressure of said feeler against said gripping member as the end of said wire is reached.

In witness whereof, we have hereunto set our hands.

JOHANNES MARINUS van der POEL.
HENRICUS GOOSKENS.